May 25, 1926.

J. E. COCHRAN 1,586,352

MEANS FOR MOLDING MONUMENTS AND THE LIKE FROM PLASTIC MATERIAL

Filed Feb. 26, 1925

Inventor
Joseph E. Cochran

By Robert Watson
Attorney

Patented May 25, 1926.

1,586,352

UNITED STATES PATENT OFFICE.

JOSEPH EDWIN COCHRAN, OF CHICAGO, ILLINOIS, ASSIGNOR OF ONE-HALF TO ELLIS T. CRAWFORD, OF CHARLESTON, WEST VIRGINIA.

MEANS FOR MOLDING MONUMENTS AND THE LIKE FROM PLASTIC MATERIAL.

Application filed February 26, 1925. Serial No. 11,785.

The purpose of this invention is to provide a mold for monuments and the like, having a base which carries the type for the inscription on the monument, and having an opening adapted to receive an ornamental mold part for molding an ornamental design on the monument, when desired. In connection with the base, I provide a frame constituting the ends and sides of the mold, which is adjustable on the base to include or exclude the ornamental design. Thus, according to the position of the frame, the stone or monument will bear merely an inscription, or will bear an inscription and ornamental design. The arrangement is such that the base of the mold, carrying the type and the ornamental design, may be used with different frames to cast different stones while those previously cast are drying and hardening in the frames. The ornament-carrying part fits into an opening cut through the base, whereby this part may be readily removed and replaced by other ornamental parts. The inscriptions on the molded stones or monuments are made by means of type which may be cemented to and removed from the base on the mold.

In the accompanying drawing:—

Figure 1:
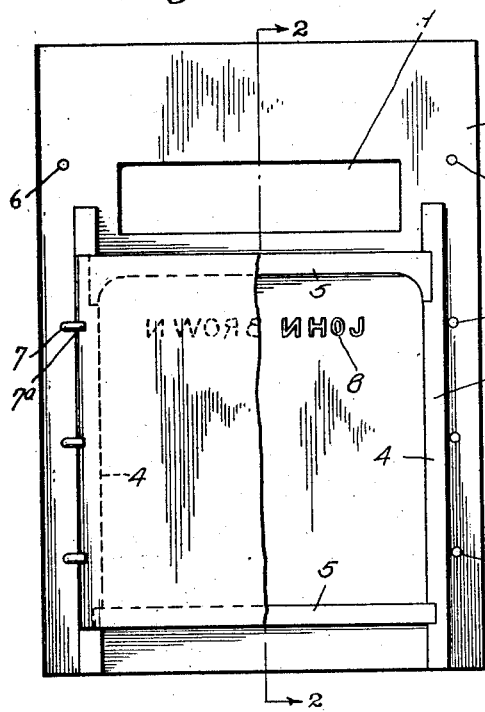
Fig. 1 is a top plan view of the mold, with the cover partly removed, showing the sliding frame in position to mold a stone without an ornamental headpiece.

Referring to the drawing, $a$ represents the base of the mold, which is preferably of wood, and which has a smooth upper surface. Near one end of the mold is an opening 1, adapted to receive a metal block 2 having an ornamental design 3 on one side. Upon the base is a movable frame $b$, comprising side bars 4 and end bars 5, which bars form the sides and ends of the mold. The base has rows of openings 6 near its lateral edges, and bolts 7, which extend through these openings and have overturned ends $7^a$, are adapted to clamp the frame to the base.

When it is desired to cast a stone without an ornamental design, the sliding frame $b$ is moved to the position shown in Fig. 1, in which the frame does not include the opening 1. Type 8 are cemented to the base piece to form the inscription on the stone. Plastic material is poured within the space bounded by the sliding frame, and tamped, the top piece 9 is then placed upon the frame and secured by turning the ends $7^a$ of the bolts over this piece and tightening the bolts. After the plastic material has been allowed to become partly set, the mold is turned over so that it rests upon the top piece 9, and the base $a$, being then uppermost, may be removed while the stone is left to further set and harden in the mold. The type faces can then be removed from the plate and replaced by other type, and the base piece can then be used with another frame and top piece to cast another stone.

Figure 3:
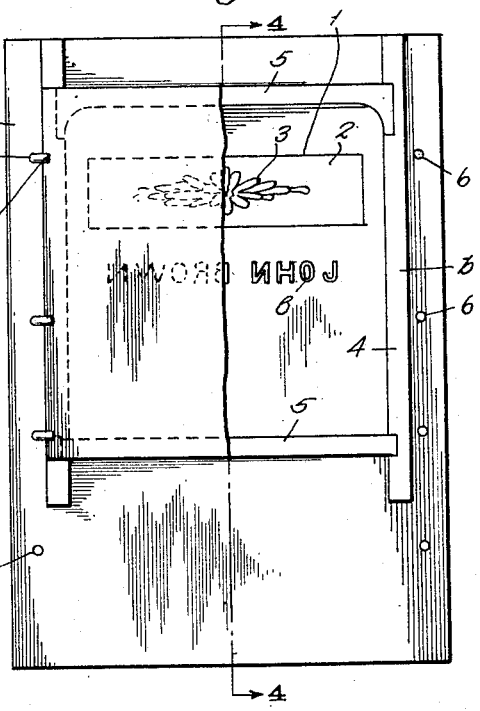
Fig. 3 is a view similar to that shown in Fig. 1 but with the sliding frame in position to mold a stone having an ornamental headpiece.
Figures 2, 4, 5:
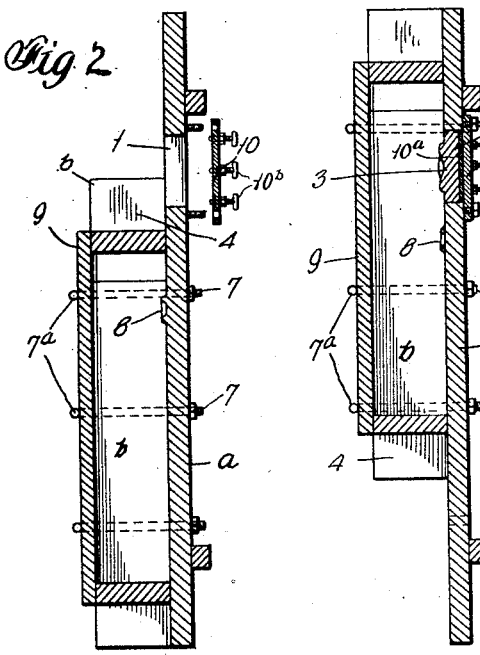
Fig. 2 is a section through the same on the line 2—2 of Fig. 1, and showing a cover up on the mold.
Fig. 4 is a section on the line 4—4 of Fig. 3, the cover being shown on the mold; and, Fig. 5 is an end view of the mold.

When it is desired to form an ornament at the top of the stone, a metal block 2 having an ornamental configuration thereon, will be set into the opening 1, and the upper surface of the block will be held flush with the face of the base plate by a suitable backing plate 10, which is detachable from the base, and an intermediate plate $10^a$ which is adjustable, to level the ornament, by means of leveling screws $10^b$ in the backing plate. The crevices between the block 2 and the base will be filled with plaster of Paris or other cementitous material, to make the surface continuous. A frame $b$ will then be placed as shown in Figs. 3 and 4, in which position the ornament-carrying block is included within the boundaries of the frame. The type to form the inscription will be cemented to the base, as before, and the molding operation will be carried out as above described. After the base has been removed from the molded stone, the backing plate 10 for the ornament-carrying block will be removed, and the block can then be removed by tapping it from its rear side, which will result in driving the block out of the opening. Or, if it is desired to cast other stones with the same ornament, this, of course, may be done.

By the method described, the base with the type and ornament-carrying block may be used with a number of different frames and tops to cast stones while those previously cast are drying and hardening in the frames.

What I claim is:—

In a mold for monuments and the like, a flat base having an opening near one end for receiving an ornamental mold part, and a frame adapted to rest upon the base and constituting the sides and end of the mold, said frame being adjustable on the base and being sufficiently shorter than the base to include said opening within its boundaries, or to exclude the same, as desired, according to the position of the mold.

In testimony whereof I hereunto affix my signature.

JOSEPH EDWIN COCHRAN.